United States Patent [19]

Scott

[11] 4,419,834
[45] Dec. 13, 1983

[54] TREATING FLUIDIZED MATERIAL

[75] Inventor: John F. Scott, Oreland, Pa.

[73] Assignee: Proctor & Schwartz, Horsham, Pa.

[21] Appl. No.: 346,923

[22] Filed: Feb. 8, 1982

Related U.S. Application Data

[63] Continuation of Ser. No. 177,190, Aug. 11, 1980, abandoned.

[51] Int. Cl.³ ............................................. F26B 17/04
[52] U.S. Cl. .................................... 34/57 A; 34/57 D; 34/181; 34/217
[58] Field of Search ................. 34/210, 215, 216, 217, 34/225, 233, 206, 181, 182, 57 A, 57 D

[56] References Cited

U.S. PATENT DOCUMENTS 3,214,844 11/1965 Oates et al. .............................. 34/10
4,215,151 7/1980 Rios et al. ............................. 432/58

FOREIGN PATENT DOCUMENTS 2004207 3/1979 United Kingdom .

*Primary Examiner*—Larry I. Schwartz
*Attorney, Agent, or Firm*—Richard H. Thomas

[57] ABSTRACT

A fluidized bed apparatus for treating particulate material comprising a foraminous support such as a perforate plate, a screen, or the like, gas supply means to supply a fluidizing gas beneath said support and a plurality of movable flights above said support adapted to sweep fluidized material along the support. The apparatus is useful for obtaining controlled residence time of materials being treated within an enclosed treating chamber.

5 Claims, 6 Drawing Figures

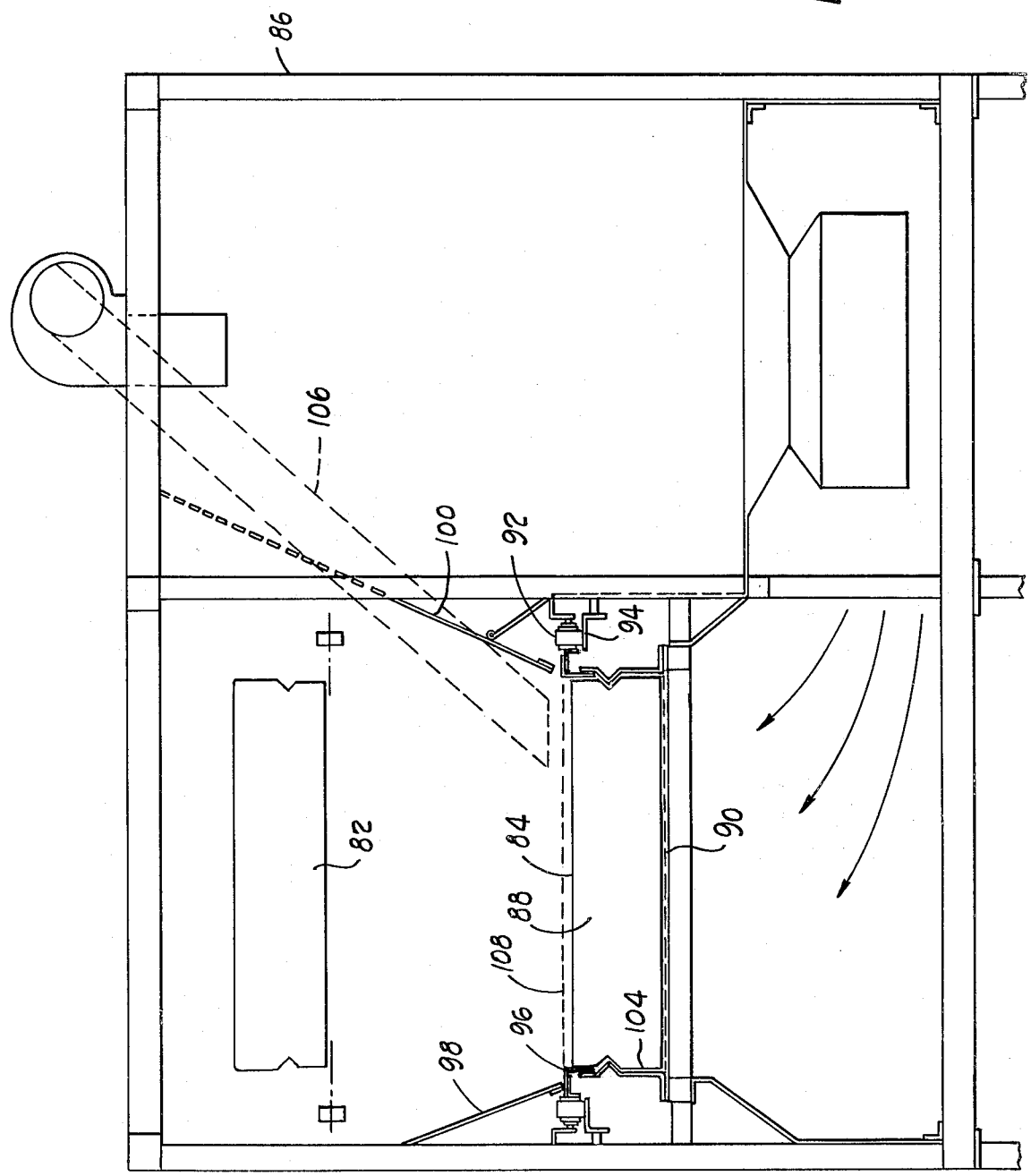

TREATING FLUIDIZED MATERIAL

This is a continuation of application Ser. No. 177,190, filed Aug. 11, 1980 now abandoned.

This invention relates to apparatus for treating particulate materials with fluidizing gases, and has for an object the provision of improvements in this art.

The apparatus of the present invention is especially adapted for such heat treating processes as drying, toasting, roasting and freezing of particulate food materials and will be described with reference to the same, although it will be apparent to those skilled in the art that the present invention has other application, for instance chemical treatment of particulate materials. The treatment is adapted to improve the product and speed up production rate by simple and relatively inexpensive apparatus.

BACKGROUND OF THE INVENTION

It is known to dry or treat materials by depositing such wet material upon a foraminous conveyor or perforate support and advancing the material along while blowing heated air through it, the air being returned to heating (or cooling) and/or drying means and recirculated. Such treatment is used for toasting, puffing, cooling, curing, conditioning, or treatment involving chemical or physical reactions on a product.

Prior U.S. Pat. No. 3,214,844, to F. B. Oates et al, discloses one such apparatus comprising a conveying means in the form of a plurality of connected open top receptacles, each having a perforate bottom. The conveying means are positioned within a treatment chamber, and means are provided for passing a treating gas upwardly through the perforate bottoms of the open top receptacles to fluidize or levitate particulate material disposed within the receptacles. Movement of the conveying means longitudinally within the treating chamber causes the particles within the open top receptacles to be conveyed longitudinally through the chamber. An alternative embodiment disclosed in this patent comprises a screw conveyor positioned within a longitudinally extending trough having a perforate bottom, the screw conveyor advancing fluidized material in said trough longitudinally along the trough. Several problems exist with regard to the apparatus of this patent. For one, such apparatus is cumbersome in structure and bulky, making it extremely expensive to manufacture. In addition, particularly in the embodiment employing a plurality of successive, connected receptacles, it is a problem to seal the areas between the receptacles against either lodging of material in such areas or bypassing of the receptacles by the treating gas.

An improved apparatus is disclosed in prior U.S. Pat. No. 3,293,768, to Blank and Scott, comprising a traveling perforate bottom support for material to be treated, means for forcing gas upwardly through the support in a series of longitudinally spaced parallel streams along the length of travel of the support to lift and fluidize the material in each upwardly flowing stream of gas, and additional means returning at least part of the gas down through the bed of material in a plurality of down-flowing streams intermediate the up-flowing streams to redeposit material on the bed, establishing a kind of rolling or tumbling of the fluidized material within the bed. The '768 patent is assigned to assignees of the present application, and the disclosure of such patent is incorporated by reference herein.

SUMMARY OF THE PRESENT INVENTION

According to the present invention, there is provided apparatus for treating particulate material of a wide range of sizes comprising means defining an enclosed treating chamber, a foraminous support extending longitudinally within said chamber for supporting a bed of material within the chamber; gas supply means beneath said support; means for supplying gas to said gas supply means under sufficient pressure to levitate the material of said bed; and a plurality of successive flights movable above said support to move said material longitudinally along the support.

The foraminous support of the present invention may or may not be stationary. For instance, a vibrating support may be useful in certain applications. Also, the support can be of a wide variety of materials, for instance a wire screen, steel plate, or ceramic material.

Preferably, the support is provided with stationary side plates extending above the support, said movable flights extending between the side plates. A pair of spaced apart endless conveyor means extends longitudinally adjacent to the upper edges of said side plates, the movable flights being suspended from the conveyor means. Seal means may be employed at the entering and leaving ends of the treating chamber and elsewhere to provide one or more treating compartments, the seal means comprising solid surfaces above and below the flights effectively bridging at least two of the flights.

If desired, a perforate screen may be provided above the flights to prevent bed material from escaping from the bed. The perforate screen may be stationary or movable with the flights.

In one embodiment of the present invention, fluidization or levitation of the bed of wet material is first carried out with cold air in a cold-air compartment, fluidization subsequently being carried out with hot air in a hot-air compartment, sealed from the cold-air compartment. This is very useful by way of example for such materials as wet noodles or similar products which tend to clump. It was found that more effective fluidization initially could be achieved by the use of cold air. In such apparatus, however, it is important to effectively seal the hot and cold air compartments from each other.

The invention and the advantages thereof will become more apparent upon further consideration of the following specification, with reference to the accompanying drawings, in which FIG. 1 is a schematic elevation section view of a fluid-treating apparatus in accordance with the concepts of the present invention;

FIG. 3 is an enlarged section view similar to that of FIG. 2, illustrating an embodiment of the present invention.

Figure 1:
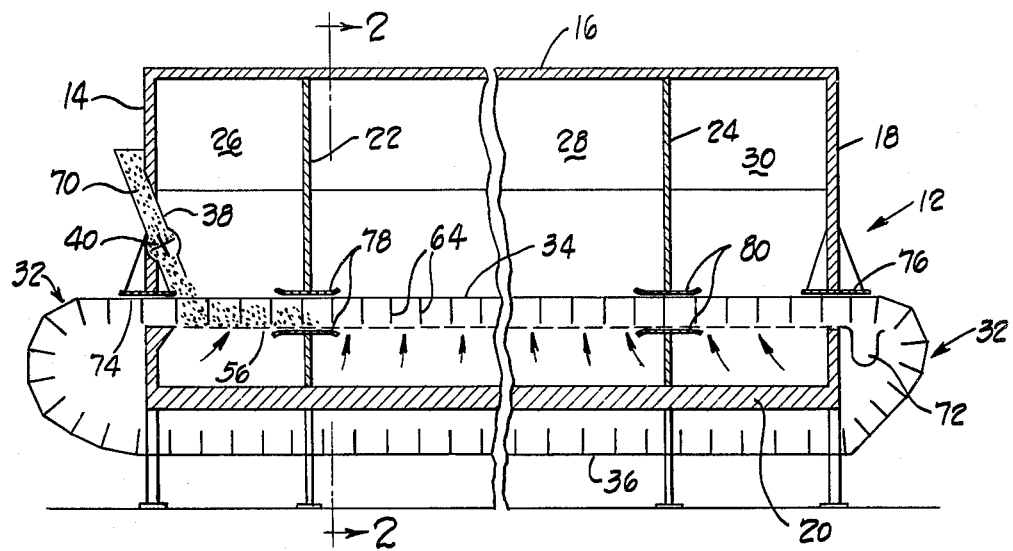
Figure 2:
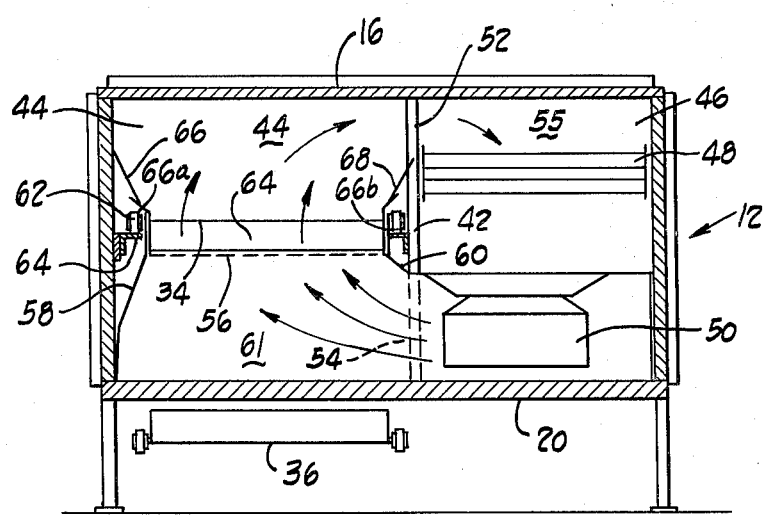
FIG. 2 is a section view taken along line 2—2 of FIG. 1.
Figure 2A:
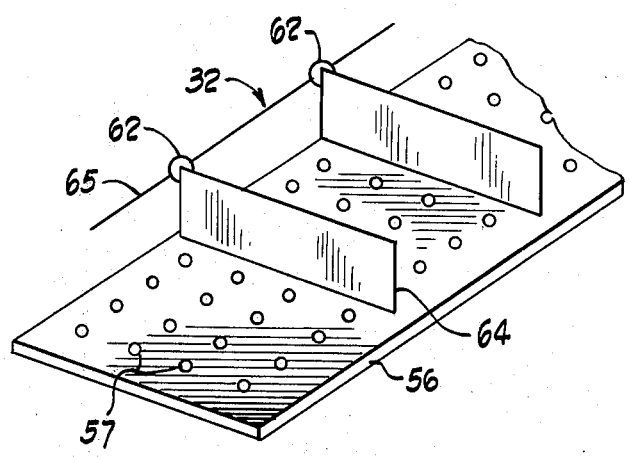
FIG. 2a is a perspective view of a portion of the apparatus of FIGS. 1 and 2.

Turning to the drawings, and in particular FIGS. 1, 2, and 2a, there is illustrated a dryer embodying the principles of the present invention generally indicated by the number 12, the dryer being in the form of a rectangular shaped housing comprising a front wall 14, a top wall 16, a rear wall 18, and a bottom wall 20. Partitions 22 and 24 divide the dryer longitudinally into three compartments, an initial fluidizing compartment 26, a main drying compartment 28, and a final drying compartment. As will be described in more detail, the temperature and velocity of the drying air or other medium in each compartment can be separately regulated. For instance, the temperature and velocity of the drying air or medium can be especially adapted in the initial fluidizing compartment to counteract the higher moisture content of the material being dried in this zone.

To convey the material being dried through the dryer, there is provided an endless conveyor means 32, extending longitudinally through the dryer, the conveyor means having an upper run 34 and a lower run 36. The conveyor means is carried by supporting sprockets which are not shown, and can be driven by any suitable motive means. In this embodiment of the present invention, the upper run 34 of the conveyor extends through the drying compartments 26, 28 and 30, the lower run being positioned below the bottom wall 20 of the dryer housing outside of the dryer. Also shown in FIG. 1 is a feed chute 38 for introducing particulate material into the initial fluidizing compartment 26. Rotary valve 40 of conventional design seals the chute 38 to prevent blow-out of bed material in the chute due to a higher than ambient pressure in compartment 26.

Details of the air or drying medium circulation are illustrated in FIG. 2. An intermediate partition 42 extends longitudinally within the dryer from the front wall 14 to the rear wall 18 dividing the dryer housing into a drying side 44, accommodating the conveyor 32 and an air conditioning side 46. The latter accommodates heat exchange coils 48 for reheating the recirculating dryer air, and fan means 50 inducing the flow of the recirculated air. Cutouts 52 and 54 in the partition 42 permit the flow of the recirculated air from the fan means 50 upwardly through the conveyor upper run 34 into a plenum chamber 55 above the heat exchange coils 48. Means not shown are provided for removing amounts of moisture laden air and replenishing the same with fresh outside air, in proportions conventional in the art.

Alternative means for circulating the treating medium upwardly through the conveyor upper run 34 are within the scope of this invention. For instance, it may be desirable, depending upon the application, to continuously withdraw expended medium and replenish the same with fresh medium. In such case, apparatus for medium recirculation may not be desired. It should also be understood that the heat exchange coils 48 can be alternative means, for instance cooling or refrigeration coils, or a direct heating device such as a burner, again depending upon application.

A novel aspect of the present invention resides in the provision of a foraminous bottom or support 56 extending longitudinally the full length of the dryer housing, as shown in FIG. 1, spaced from and parallel to the conveyor upper run 34. The support, details of which are shown in FIG. 2a, may be of any conventional design, provided with slots or holes 57 suitably dimensioned, depending upon the material being dried. As illustrated in FIG. 2, the support is positioned in the left-hand drying side of the housing, and is suitably connected to closure panels 58 and 60 of plenum chamber 61 on opposite sides, so that the flow of drying air or other medium from the fan 50 passes upwardly through the support.

In the embodiment of FIG. 2, the support is shown as stationary. Again, it may be movable. For instance, it may be desirable, depending upon application, to provide a vibrating support for better fluidization.

Details of the conveyor 32 are shown in FIGS. 1 and 2. Rollers 62 (FIG. 2) travel on longitudinally extending flanges 64 positioned on opposite sides of the foraminous support 56, above the support. The rollers are component parts of continuous conveyor chains (65, FIG. 2a) of conventional design and support a plurality of spaced-apart flights 64, which extend laterally between the left-hand and right-hand rollers. The flights are vertically oriented and positioned to provide a plurality of successive spaced-apart walls moving rearwardly across the upper surface of the perforate bottom or support 56. Panels 66 and 68 above the perforate support, including sides 66a and 66b, cause the flow of drying air to pass through the perforate bottom or support to plenum chamber 55. The flights 64 are adapted to fit closely between the stationary sides 66a and 66b to avoid passage of bed material around the edges.

In operation, the material 70 to be dried is introduced into the chute 38 and is fed down by the rotary valve 40, the valve again preventing higher pressure within the drying zone 26, as compared to ambient pressure, from forcing material outwardly through the chute. The material is deposited on top of the foraminous support 56, and then is moved by the flights 64 in a sweeping motion from the initial fluidizing chamber 26 through the main drying chamber 28 to the final drying zone 30. Exit is accomplished by sweeping the material being dried into trough 72 positioned outside of the rear wall 18.

In the embodiment of FIG. 1, seals 74 and 76 seal the front and rear walls 14 and 18 of the dryer at points of ingress and egress of conveyor 32. As shown, the seals 74 and 76 are very simple, comprising essentially flat surfaces adapted to bridge at least two flights so that at all times there is at least one flight effectively sealing the opening through which the conveyor 32 passes. Similar sealing arrangments are provided in conjunction with the partitions 22 and 24 to seal the compartments 26, 28 and 30 from each other.

By way of example, for an application such as cereal drying, the plate on which the bed of product lies may have an open area of about 10%. Air passing up through the perforations and the bed of product is at about 600 ft. per minute (versus about 200 ft. per minute for a fixed bed conventional conveyor dryer), adjusted so that the resulting static pressure below the bed equals or slightly exceeds the dead weight of the product bed. The bed is thus levitated, but being granular, immediately falls back as individual pieces, to be forced up again. The appearance is of a boiling mass in which particles circulate freely, individually supported by the air rushing up through the support. The volume occupied by the bed is typically doubled, and the bed itself behaves as a true fluid, seeking a common level. The high air velocity, coupled with free particle movement, yields high heat/mass transfer rates and excellent uniformity of particle treatment.

In this regard, an aspect of the present invention is that it can be used with a wide range of particle sizes and shapes of particulate material simply by varying different parameters such as percent open area. Wet noodles, lima beans, and many other materials are "particulate material" within the scope of the present invention.

By the use of moving flights pushing the product along over the foraminous support, the residence time of an individual particle within the dryer is closely controlled, so that all particles are dried to the same extent.

Still, by way of example, good results were obtained with the use of a foraminous support having 3/32" diameter holes on 5/16" center lines giving an open area of about 8.75%. Sides extended about 8" above the support forming a trough about 8" deep. The flights were on about 9" center lines and were driven by a variable speed drive. The flights had a close fit both with the foraminous support and the sides of the trough. The pressure drop through the support was about 4 to 8", giving very good uniform air distribution over the length of the dryer.

If desired, a movable or stationary screen can be positioned over the top of the flights 64 to prevent levitation of lighter particles above the flights to the extent of being free from sweeping movement by the flights. Such screens can be endless and timed to move with the flights along a path of travel immediately above the flights.

Typical applications for the apparatus of the present invention involve the drying or pre-drying of cereals, beans, rice, cat chow, dog meal, coffee beans, noodles, and many other materials. Other applications include roasting, toasting, freezing, conditioning, curing and chemical and physical reactions.

In this regard, one excellent use for the apparatus of the present invention is as a pre-dryer for conventional dryers providing a partially dried non-clumping product which can readily be fed to and handled by a conventional dryer. In such case, the primary purpose for the present apparatus would be conditioning the product for drying rather than drying per se. This is considered to be within the scope of the present invention.

It may be desirable to provide Teflon edges on the moving flights or alternatively on the foraminous support and its sides, to reduce contact resistance. Clearance should be close enough to prevent product from jamming at the flight edges. Fines may be collected from the recirculating air by the use of cyclones or some other means following known practice.

Typical drying temperatures may be about 150° F. to 500° F. The depth of a typical drying bed before fluidizing may be about 1-4 inches.

An embodiment of the present invention is illustrated in FIG. 3. In this figure the endless conveyor means is provided with upper and lower runs 82 and 84, both positioned within the dryer housing 86. In this embodiment, the lower run 84 has flights 88 which sweep the upper surface of a foraminous support 90. As in the embodiment of FIGS. 1 and 2, the flights 88 are supported from rollers 92 running along flanges 94 on opposite sides of the drying chamber. Arms 96 extending from the rollers actually support the flights 88. Seal plates 98 and 100 are in sealing engagement or contiguous with the arms to prevent fouling of the chain mechanism by particulate material. Chute 106 is provided to introduce feed material onto the foraminous support 90. Shown in FIG. 3 is screen 108 above the flights 88 to prevent flow of fine material upwardly above the upper edges of the flights.

Figure 4:
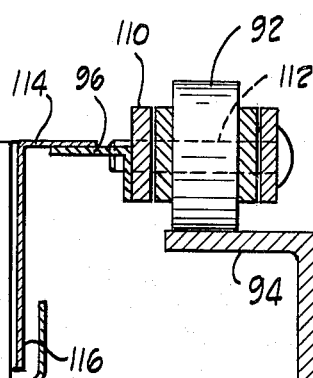
FIG. 4 is a further enlarged elevation view illustrating details of the apparatus of FIG. 3.
Figure 5:
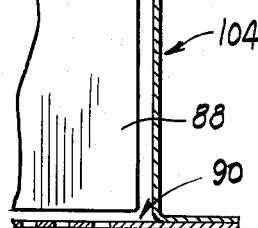
FIG. 5 is a side view of a portion of the apparatus of FIG. 4.

Further details of the apparatus are shown in FIG. 4. The arms 96 are shown as welded to the chain links or side bars 110. In this regard, the conveyor chain is conventional, the spaced rollers 92 being connected together by the side bars 110 through pins 112. Ell shaped flanges 114 connect the flights 88 to the arms 96. These ell shaped flanges also support a plurality of overlapping traveling guards 116 which extend longitudinally parallel to sides 104 but spaced inwardly from the sides. Two guards are shown in more detail in FIG. 5 and are of known design provided with an offset 118 so as to have surfaces 118' and 118" slightly offset in a lateral direction. Thus, a surface 118 can overlap a surface 118" of a next succeeding guard. The purpose of this is to provide a traveling guard means which is movable as part of the endless conveyor and articulated to travel with the conveyor around end sprockets on which the conveyor is supported.

The upstanding sides 104 which extend from the surface of the foraminous support 90 confine the edges of the flights 88 with little clearance. Indentation 120 deflects upwardly moving air inwardly. By spacing the traveling guard means close to the sides 104, but above the indentation 120, upwardly fluidized particulate material is prevented from leaving the bed and fowling the conveyor chain mechanism.

In the above example, the conveyor was described as one having side bars or links connecting spaced rollers. It is possible to employ a simple cable mechanism adapted to move the flights through the dryer chamber.

Prior U.S. Pat. No. 3,341,949 to Flaith et al, assigned to assignees of the present invention, describes a seal arrangement adapted to prevent flow of particulate material past a supporting surface onto conveyor side chains, where the material could collect and dry requiring periodic shutdown and cleaning. In this seal arrangement, a portion of the drying air is diverted from the particulate material supporting surface and is caused to flow between inner and outer guard elements in such a direction as to block the escape of particulate material onto the side chains. This arrangement can be practiced in the present invention and the disclosure of this prior patent is incorporated by reference herein.

Advantages of the present invention should be evident. By sweeping the bed of material through the dryer housing, the residence time of the material in the housing can be carefully controlled, each particle receiving the same time exposure as all other particles. At the same time this is carried out in a simple manner and without the cumbersome expensive structure of the Oates et al patent.

Still further, the use of a plurality of spaced flights permits the apparatus to very easily be divided into a plurality of separate zones sealed from each other. This is of particular advantage in such cases as the drying of wet noodles when it is desirable to have an initial cold-air or fluidizing chamber followed by the hotter drying chambers.

What is claimed is:

1. A fluid bed apparatus for controlled residence treating of particulate material comprising
    means defining an enclosed treating chamber;
    a foraminous support extending longitudinally within said chamber for supporting a bed of material within the chamber, said support having an exit end;
    gas supply means beneath said foraminous support;
    means for supplying gas to said gas supply means under sufficient pressure to levitate the material in said bed and to form a fluidized bed;

a series of spaced-apart flight means substantially coextensive with the fluidized bed movable longitudinally above said foraminous support past the exit end of said support, the lower edges of said flight means being substantially contiguous with the foraminous support and the upper edges of the flight means being no lower than the bed upper surface, thereby moving the entire bed of said material confined by the flight means longitudinally and uniformly along said support to control the residence time of the particulate material in said chamber, said flight means being independent of the support.

2. The apparatus of claim 1 wherein said foraminous support is stationary.

3. The apparatus of claim 1 comprising upright surfaces defining sides extending above said foraminous support, said flight means extending between said sides.

4. The apparatus of claim 3 comprising endless conveyor means extending longitudinally adjacent the upper edge of said sides, said flight means being supported from said conveyor means.

5. The apparatus of claim 4 including seal means in said chamber dividing the chamber into at least two treating compartments, said seal means including coextensive solid surfaces in engagement with said lower and upper edges simultaneously of at least two of the flight means.

* * * * *